(12) United States Patent
LaFrance-Linden

(10) Patent No.: US 7,426,684 B2
(45) Date of Patent: Sep. 16, 2008

(54) LOST-CYCLE MEASUREMENT USING CYCLE COUNTER

(75) Inventor: David C. P. LaFrance-Linden, Bedford, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 706 days.

(21) Appl. No.: 11/118,929

(22) Filed: Apr. 29, 2005

(65) Prior Publication Data

US 2006/0248436 A1   Nov. 2, 2006

(51) Int. Cl.
  *G06F 11/00* (2006.01)
  *H03M 13/00* (2006.01)
(52) U.S. Cl. ........................ 714/820; 714/38

(58) Field of Classification Search ................ 714/820, 714/746, 704, 38; 717/127, 139; 700/115
See application file for complete search history.

(56) References Cited

U.S. PATENT DOCUMENTS

| 5,913,043 | A  | * | 6/1999 | Carter et al. ................ 710/100 |
| 6,374,367 | B1 | * | 4/2002 | Dean et al. .................... 714/37 |
| 7,031,382 | B2 | * | 4/2006 | Hessel et al. ................ 375/229 |

* cited by examiner

*Primary Examiner*—Shelly A Chase

(57) ABSTRACT

A method of lost-cycle measurement using a cycle counter. In some embodiments, the lost-cycle measurement method comprises: getting a current cycle counter value; finding a number of elapsed cycles between the current cycle counter value and a preceding cycle counter value; determining whether the number of elapsed cycles is indicative of lost cycles; and repeating.

20 Claims, 6 Drawing Sheets

206

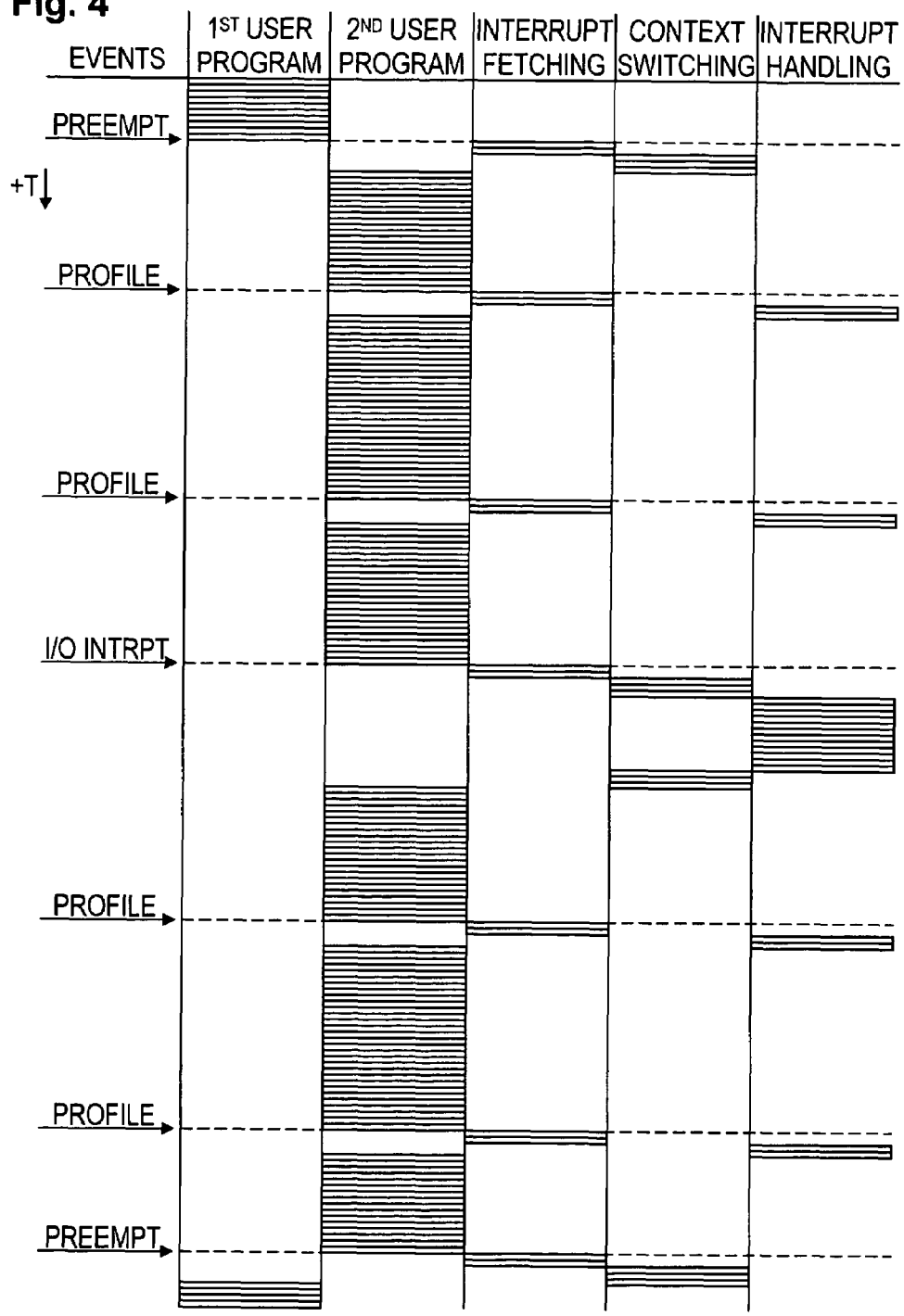

```
1   fastLoops = slowLoops = 0;
2   totalCycles = fastCycles = blipCycles = 0;
3   last = cycle_counter();
4   while (totalCycles < CYCLES_PER_REPORT) {
5     now = cycle_counter();
6     diff = cycle_diff(now, last);
7     if (diff < 0) {
8       break;
9     }
10    totalCycles += diff;
11    last = now;
12    if (diff < BLIP_SIZE) {
13      fastLoops += 1;
14      fastCycles += diff;
15    } else {
16      slowLoops += 1;
17      blipCycles += diff;
18    }
19  }
20  cyclesPerLoop = fastCycles / fastLoops;
21  lostCycles = blipCycles – slowLoops * cyclesPerLoop;
22  gotCycles = fastCycles + slowLoops * cyclesPerLoop;
```

Fig. 5

```
1   totalCycles = 0;
2   for( i=0; i<= MAX_BIN; i++) {
3     intrHist[i] = betwHist[i] = 0;
4   }
5   start = cycle_counter();
6   last = start;
7   while (totalCycles < CYCLES_PER_REPORT) {
8     now = cycle_counter();
9     diff = cycle_diff(now, last);
10    totalCycles += diff;
11    if (diff ≥ BLIP_SIZE) {
12      binNum = diff2bin(diff);
13      intrHist[binNum] += 1;
14      diff = cycle_diff(last, start);
15      binNum = diff2bin(diff);
16      betwHist[binNum] += 1;
17      start = now;
18    }
19    last =now;
20  }
```

Fig. 7

LOST-CYCLE MEASUREMENT USING CYCLE COUNTER

BACKGROUND

Computer software commonly operates in a multi-tasked environment. A multi-tasked environment is an environment that supports concurrent execution of multiple software processes. For example, a computer can simultaneously execute a user application (e.g., a word processor) and another software application that allows a programmer to debug, profile, or simply monitor performance of the user application. The computer's operating system itself can also execute multiple processes running in a multi-tasked environment.

A number of mechanisms exist for implementing multi-tasking, such as preemptive multi-tasking. In one example of preemptive multi-tasking, a scheduler process organizes the various other software processes into a queue and repeatedly cycles through the queue, allowing each process to execute for a predetermined time before it is interrupted to give the next process a turn. The predetermined time may be some very small fraction of a second so that the scheduler process cycles through the queue many times every second, thereby giving the appearance that all of the processes are all running at the same time.

Preemptive multi-tasking can also be employed in a multi-processor environment where the various software processes are competing for cycles on any one of multiple processors. The existence of multiple processors allows multiple processes to execute simultaneously on different processors, but the number of processes generally exceeds the number of processors. Thus, each processor periodically interrupts a currently running process to allow the next scheduled process to take a turn or to handle I/O interrupts and profiling interrupts. The scheduler process allocates time to each process, giving the illusion that all processes are all running at the same time.

Each time a process is interrupted and control is passed to another process, a context switch occurs. A context switch involves saving the "state" of the computer processor and loading the computer processor with the previously saved state for the next process. Most multi-tasked environments are designed so that none of the processes are internally affected by being constantly interrupted and being forced to take turns.

One consequence of operating in a multi-tasked environment is that process execution is hampered since some processes are dormant while other processes execute. In many situations, it becomes important for a programmer to be able to measure the percentage of cycles that are lost (or, conversely, the percentage of cycles that are available) to a user process. Preferably, the lost-cycle measurement is accurate and includes any cycles unavailable to the user process, such as cycles spent in context switching, interrupt handling, interrupt code set-up and tear-down, and I/O processing. Moreover, the measurement numbers should be made easily available for analysis by the programmer.

BRIEF DESCRIPTION OF THE DRAWINGS

For a detailed description of various embodiments, reference will now be made to the accompanying drawings in which:

FIG. 4 is an exemplary cycle usage diagram in accordance with certain embodiments of the invention;

FIG. 5 is a pseudo-code listing of an exemplary lost-cycle measurement process in accordance with certain embodiments of the invention;

FIG. 7 is a pseudo-code listing of an exemplary interrupt time measurement process in accordance with certain embodiments of the invention.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to suggest that the scope of the disclosure, including the claims, is limited to that embodiment.

Figure 1:
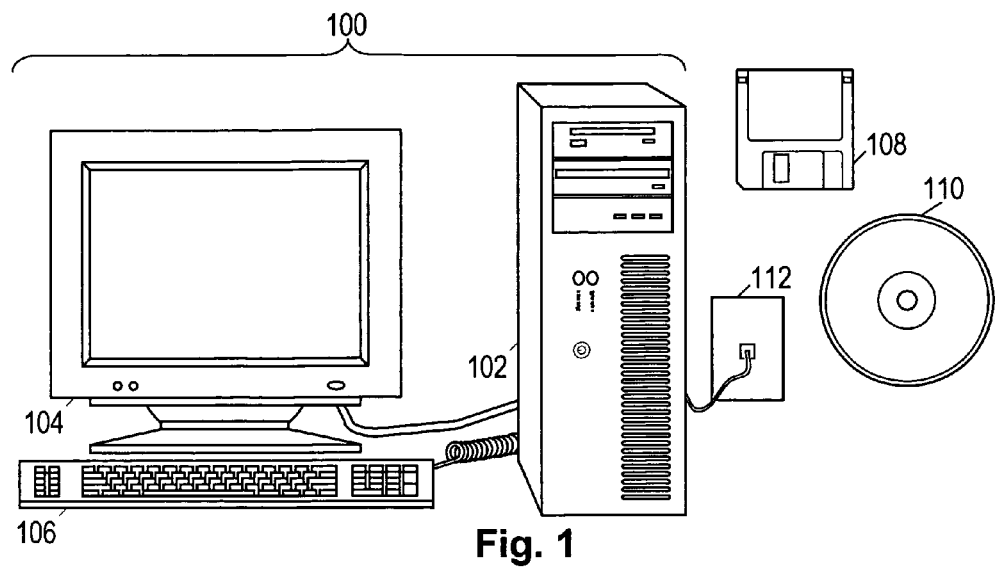
FIG. 1 is an external view of an exemplary lost-cycle measurement system with information carrier media, in accordance with certain embodiments of the invention.

FIG. 1 shows an exemplary system for executing software that is subject to interrupts or other sources of lost cycles. The exemplary system is shown in the form of a desktop computer 100, although any electronic device that makes a cycle counter accessible to user applications can be configured to carry out the methods disclosed herein. Among other things, servers, portable computers, personal digital assistants (PDAs) and software-based consumer electronics can be configured to carry out the disclosed decision making methods.

Desktop computer 100 includes a chassis 102, a display 104, and an input device 106. The chassis 102 includes a processor, memory, and information storage devices. In some embodiments, one or more of the information storage devices store programs and data on removable storage media such as a floppy disk 108 or a compact disc 110. The chassis 102 further includes a network interface that allows the computer 100 to receive information via a wired or wireless network.

Collectively, information storage media and information transport media are termed information carrier media.

The chassis 102 is coupled to the display 104 and the input device 106 to interact with a user. The display 104 and the input device 106 together operate as a user interface. The display 104 is shown as a video monitor, but can take many alternative forms including a printer, a speaker, or other means for communicating information to a user. The input device 106 is shown as a keyboard, but can similarly take many alternative forms including a button, a mouse, a keypad, a dial, a motion sensor, a camera, a microphone or other means for receiving information from a user. In some embodiments, the display 104 and the input device 106 are integrated into the chassis 102.

Figure 2:
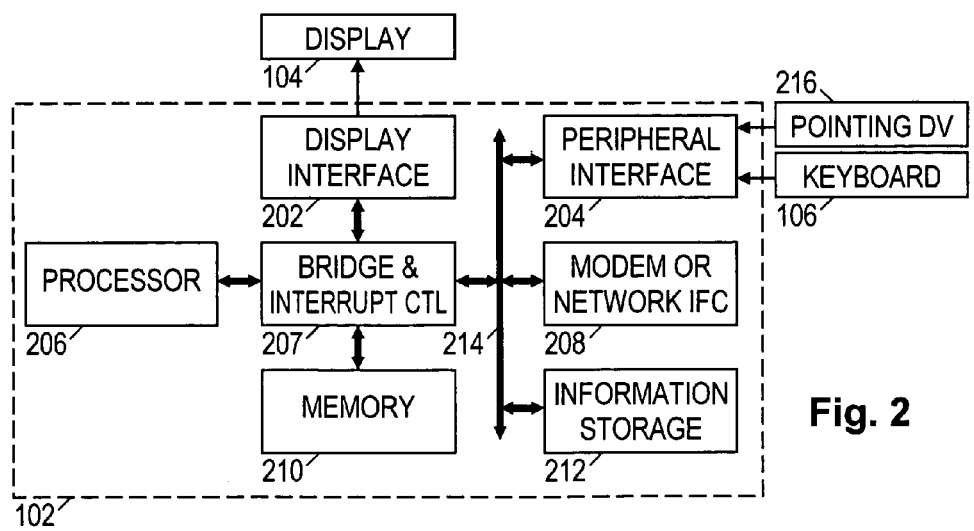
FIG. 2 is a block diagram of the exemplary lost-cycle measurement system of FIG. 1, in accordance with certain embodiments of the invention.

FIG. 2 shows a simplified functional block diagram of the desktop computer 100. The chassis 102 includes a display interface 202, a peripheral interface 204, a processor 206, a bus bridge 207, a modem or other suitable network interface 208, a memory 210, an information storage device 212, and a bus 214. The computer 100 is a bus-based system, with the bus 214 interconnecting the bus bridge 206 with the peripheral interface 204, the network interface 208, and the information storage 212. The bus bridge 206 provides high-bandwidth communications between the bus, the display interface 202, the processor 206, and the memory 210.

The display interface 202 can take the form of a video card or other suitable display interface that accepts information from the bus bridge 207 and transforms it into a form suitable for the display 104. Conversely, the peripheral interface 204 can accept signals from the keyboard 106 and other input devices such as a pointing device 216, and transform them into a form suitable for communication on the bus 214.

The processor 206 gathers information from other system elements, including input data from the peripheral interface 204, program instructions and other data from the memory 210, the information storage device 212, or from a remote location via the network interface 208. The processor 206 carries out the program instructions and processes the data accordingly. The program instructions can further configure the processor 206 to send data to other system elements, including information for the user which can be communicated via the display interface 202 and the display 104.

In some embodiments, the bus bridge 207 operates as a bus controller for bus 214, and incorporates an interrupt controller. The interrupt controller monitors interrupt signals from the display interface 202, the peripheral interface 204, the network interface 208, and information storage 212, and can further monitor interrupt signals from a power supply and an internal clock. Upon the assertion of any one of these signals, the interrupt controller asserts an interrupt signal to the processor 206. The processor interrupt signal causes the processor 206 to halt normal processing and to execute an interrupt handler that determines the source of the interrupt and takes appropriate action. For example, if the interrupt is caused by typing a key on the keyboard 106, the interrupt handler captures the keyboard input and places the corresponding character in the appropriate memory buffer.

The network interface 208 enables the processor 206 to communicate with remote systems via a network. The memory 210 serves as a low-latency temporary store of information for the processor 206, and the information storage device 212 serves as a long term (but generally high-latency) store of information.

The processor 206, and hence the computer 100 as a whole, typically operates in accordance with one or more programs stored on the information storage device 212. The processor 206 copies portions of the programs into the memory 210 for faster access, and can switch between programs or carry out additional programs in response to user actuation of the input device. The additional programs can be retrieved from the information storage device 212 or can be retrieved from remote locations via the network interface 208. One or more of these programs configures the computer 100 to carry out at least one of the lost-cycle measurement methods disclosed herein.

Figure 3:
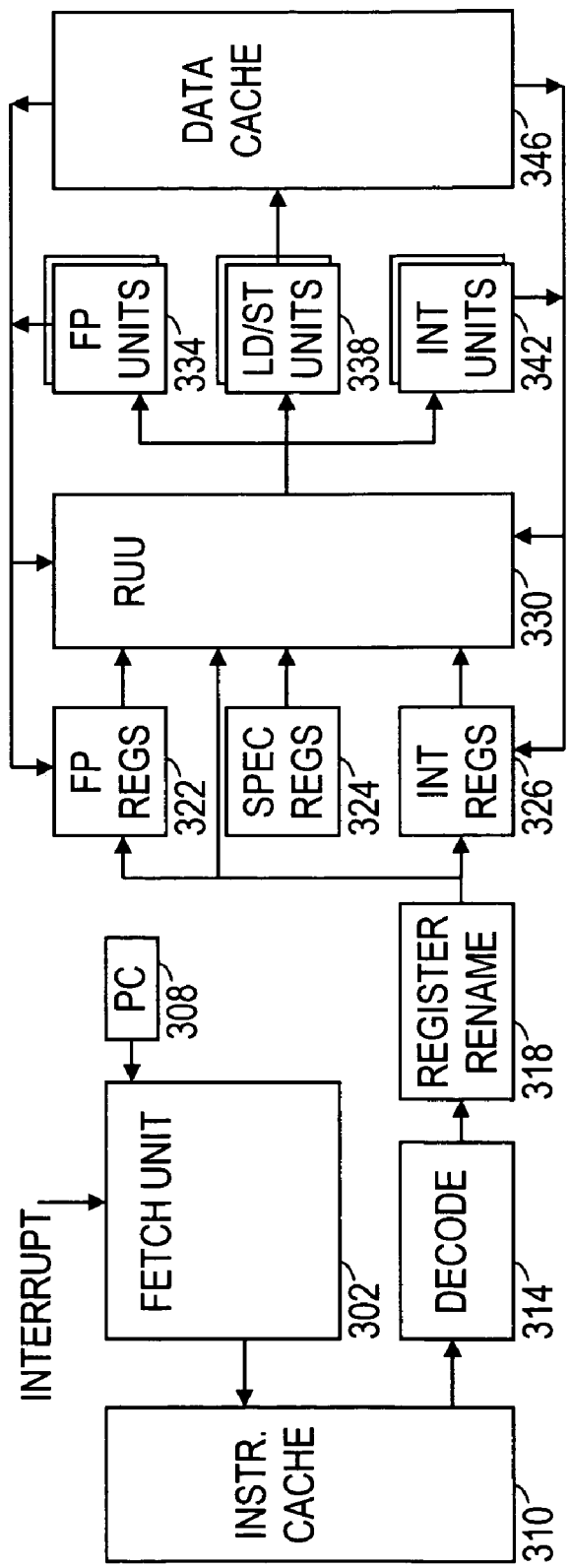
FIG. 3 is a block diagram of an exemplary processor suitable for use in a lost-cycle measurement system, in accordance with certain embodiments of the invention.

FIG. 3 shows the processor 206 of FIG. 2 in greater detail. Processor 206 comprises a pipelined architecture that includes a series of functional units, arranged so that several units can simultaneously process appropriate parts of several instructions. As shown, the exemplary embodiment of processor 206 includes a fetch unit 302, a program counter 308, an instruction cache 310, decode logic 314, register rename logic 318, floating point and integer registers 322, 326, a register update unit 330, execution units 334, 338, and 342, and a data cache 346.

Program counter 308 is a register that contains the address of the next instruction to be fetched by the fetch unit 302. Fetch unit 302 uses a program counter 308 to determine which instructions to fetch, but employs branch prediction logic to anticipate which instructions are to be fetched. The branch prediction logic permits the fetch unit 302 to speculatively retrieve instructions to be executed after a conditional branch instruction. In order to keep the pipeline full (which is desirable for efficient operation), the fetch unit speculates on the outcome of a branch instruction before the branch instruction is actually executed. The speculation is generally based on previous executions of the branch instruction. Many speculation algorithms are known and may be used.

Referring still to FIG. 3, instruction cache 310 provides a temporary storage buffer for the instructions to be executed. Decode logic 314 retrieves the instructions from instruction cache 310 and determines the type of each instruction (e.g., add, subtract, load, store, etc.). Decoded instructions are then passed to the register rename logic 318 that maps logical registers onto a pool of physical registers.

The register update unit ("RUU") 330 provides an instruction queue for the instructions to be executed. The RUU 330 serves as a combination of global reservation station pool, rename register file, and reorder buffer. The RUU 330 also breaks load and store instructions into an address portion and a memory (i.e., register) reference. The address portion is placed in the RUU 330, while the memory reference portion is placed into a load/store queue (not specifically shown in FIG. 3).

The floating point register 322 and integer register 326 are used for the execution of instructions that require the use of such registers. These registers 322, 326 can be loaded with data from the data cache 346. The registers also provide their contents to the RUU 330.

In addition to the program counter 308, other special-purpose registers 324 can be provided. For example, in some embodiments, the processor 206 includes a cycle counter that begins at zero and increments once for each clock cycle, rolling over whenever the full range of the register is exceeded. For example, in a 32-bit cycle counter in a 1 GHz processor, rollover occurs roughly once every 4 seconds. In a 64-bit cycle counter in a 1 GHz processor, rollover would only occur roughly once every 580 years. In alternative implementations, the starting value of the cycle counter may be left to chance, and/or the cycle counter may increment in proportion to the number of elapsed clock cycles (e.g., incrementing once for every four clock cycles). The special purpose registers may be accessed directly or, in alternative processor embodiments, load their contents into an integer register 326.

As shown, the execution units 334, 338, and 342 comprise floating point execution units 334, load/store execution units 338, and integer execution units 342. Each execution unit performs the operation specified by the corresponding instruction type. Accordingly, the floating point execution units 334 execute floating instructions such as multiply and divide instructions while the integer execution units 342 execute integer-based instructions. The load/store units 338 perform load operations in which data from memory is loaded into a register 322 or 326. The load/store units 338 also perform load and store operations in which data is transferred between registers 322, 326 and the data cache 346 and/or memory 210 (FIG. 2). Each of these execution units 334, 338, and 342, can be pipelined. Accordingly, in some embodiments, each operation takes multiple cycles to complete, but multiple operations are being executed in parallel.

The data cache 346 operates by storing recently accessed data in a pool of temporary, fast memory blocks. When the pool is filled, the least-recently used block is usually targeted for "replacement," i.e., the data cached in that block is replaced with the most recently accessed data.

The architecture and components described above are typical of microprocessors, and particularly pipelined, multi-threaded processors. Numerous modifications can be made from the exemplary embodiment shown in FIG. 3. For example, the locations of the RUU 330 and registers 322, 326 can be reversed if desired.

Fetch unit 302 is configured to receive an interrupt signal from the interrupt controller in bridge 207. Assertion of the interrupt signal causes the processor to halt execution of the current instruction thread, temporarily store certain processor state values, and begin execution of an interrupt service routine ("handler"). The interrupt handler is a program designed to determine the source of the interrupt, take whatever action is necessary to resolve the interrupt, and return control of the processor to the original instruction thread. The consequence of an interrupt is that an interrupt handler is executed between two instructions of the original instruction thread. The original instruction thread suffers a loss of processor cycles that is due not only to the execution of the interrupt handler, but is also due to the number of cycles required for the fetch unit 302 to retrieve interrupt service routine instructions (which would typically be absent from instruction cache 310), the number of cycles required to drain in-flight instructions from the execution pipeline, the number of cycles required to store the register contents to memory 210, the number of cycles required to restore the register contents from memory once the interrupt service routine has completed, and the number of cycles required to refill the execution pipeline.

FIG. 4 is an example of a processor's allocation of processor cycles. In the example shown, the processor executes one instruction per cycle, as represented by a sequence of rectangles. For illustration purposes, the time axis is vertical, with time increasing from the top of the page. The left hand column of the figure shows a sequence of events, and the rest of the figure shows how the processor's cycles are distributed among various tasks in response to the events.

The tasks shown are a first user program, a second user program, an interrupt fetching task, a context switching task, and an interrupt handling task. The first and second programs are applications running in a multi-tasked environment on the processor. The interrupt fetching task represents the cycles required to identify an interrupt source and invoke the appropriate interrupt handler. The context switching task represents the cycles required to store a processor's state in memory and/or to restore a stored state from memory. The interrupt handling task represents the cycles required for an interrupt handler to take appropriate action in response to the interrupt.

The first event shown in FIG. 4 is a preemption interrupt, in which the first user program is interrupted and control is passed to the second user program. As with each of the other events, a few cycles are lost to the interrupt fetching task. In addition, however, extra cycles are required for the context switch between the two programs.

The second and third events shown in FIG. 4 are profiling interruptions, which a software profiler uses to periodically interrupt a running software program and to identify which part of the program is being executed. Software profilers are used to gather statistics for analyzing operation and performance of a software program. Some profilers are able to avoid a context switch, but they still require a small number of cycles to store the value of the program counter.

The fourth event shown in FIG. 4 is an I/O interrupt, e.g., an interrupt triggered by a network interface to allow the processor to handle network traffic. Other examples of I/O interrupts are keyboard interrupts, pointing device interrupts, video or sound interrupts, and direct memory access ("DMA") interrupts. In the case of I/O interrupts, a context switch might be needed before the interrupt handler can run, and if so, a second context switch to restore the register contents would be needed before control is returned to the user process.

Three interrupt types have been described and shown in the figure. These interrupts are exemplary of a whole class of causes for processor cycle loss, and are not meant to be exclusive. As another example, processor cycle loss is expected when cache misses are encountered and a processor is forced to wait for the desired instructions or data to become available.

FIG. 5 shows a pseudo-code listing of an exemplary process for measuring processor cycle loss. The exemplary process uses a user-accessible cycle counter that is available in most processors. For example, a software programmer using C can access the cycle counter on an Alpha processor using the "rpcc" instruction, which is an assembly language instruction usable via the "asm" (assembly language) mechanism built into C, but which is also usable via an _RPCC( ) function call when the appropriate C header file is included. As another example, on an IA64 processor, there is an interval time counter ("ITC application register") which is accessible via a similar assembly language call or via a "get_cycles( )" function call in Linux's C compiler when the "<asm/timex.h>" system header file is included. Linux also offers a "get_cycles( )" function call for Opteron and x86 processors. In software intended for multi-platform use, these differences can be accommodated at compile time with a compiler-specific version of a standard cycle_counter( ) macro. Also, a compiler-specific version of a cycle_diff( ) macro can be used to accommodate cycle counter format variations when calculating elapsed cycles.

At a high-level, the exemplary measurement process can be described as a loop that repeatedly checks the cycle counter and determines the number of cycles that have lapsed since the previous cycle counter reading. The number of lapsed cycles is categorized as being either small (a fast loop) or large (a slow loop). The number of each type of loop and the corresponding amount of cycles spent in each type are tracked. From these numbers, the number of cycles used and lost can be calculated.

Beginning then in lines 1 and 2 of FIG. 5, the loop count variables and cycle counting variables are initialized to zero.

In line 3, the "last" variable is initialized to the current value of the cycle counter. After this point, the "last" variable will be used to store previous cycle counter readings.

Lines 4-19 of FIG. 5 form a loop that is executed until a predetermined number of cycles have elapsed. In line 5 the "now" variable is set equal to the current value of the cycle counter. In line 6, the "diff" variable is set equal to the number of cycles between the "now" and the "last" variables. In lines 7-9, a test is made to determine if the "diff" variable is negative, which would indicate a quirky condition which can be caused by rescheduling the process to a different processor whose cycle counter is not synchronized with the original processor. (Such rescheduling is often caused by load-shifting.) If such a condition has occurred, the loop terminates in line 8 with the break command. Otherwise the loop continues.

In line 10, the "totalCycles" variable is updated with the number of cycles for this iteration of the loop, and in line 11, the "last" variable is set equal to the previous reading of the cycle counter. In line 12, the number of elapsed cycles is compared to a threshold. (Depending on the compiler and the processor, a suitable threshold value may be between 25 and 75 cycles. In any event, the software could allow for the threshold value to be user-specified.) If the number is less than the threshold, the loop iteration is categorized as a fast iteration, and lines 13-14 are executed. Otherwise, the loop iteration is categorized as a slow iteration, and lines 16-17 are executed. The appropriate iteration counter ("fastLoops" or "slowLoops") is updated, and the corresponding cycle count ("fastCycles" or "blipCycles") is updated. Both branches are carefully composed to require the same amount of cycles.

Once the loop completes, the number of cycles required to execute each loop iteration is calculated in line 20. In lines 21-22, this value is then used in combination with the slow and fast iteration cycle counts to determine the number of lost cycles and the number of used ("got") cycles. From these numbers, the percentage of processor cycles available to user processes can be calculated. A single process's processor utilization percentage is:

$$U = \frac{gotCycles}{totalCycles} \times 100\%. \quad (1)$$

Figure 6:
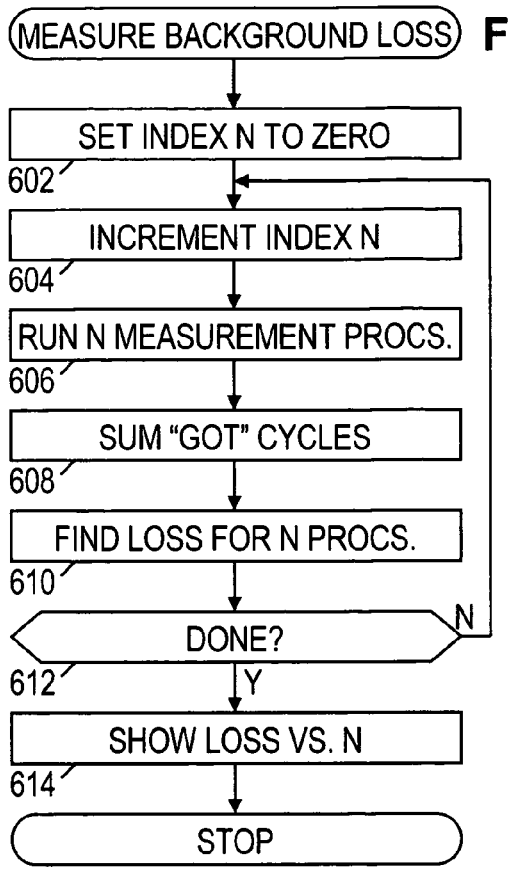
FIG. 6 is a flow diagram of an exemplary background lost-cycle measurement method in accordance with certain embodiments of the invention.

FIG. 6 shows an exemplary flow diagram for characterizing a processor's background loss as a function of the number of user processes running. In block 602, a loop index n is set equal to zero. In block 604 the loop index is incremented. In block 606, n measurement processes are executed concurrently. In block 606, the used ("got") cycles for each process are summed, and in block 610, the processor loss percentage is calculated. The loss percentage can be determined by subtracting the processor utilization percentage U(n) from 100%, i.e., L(n)=100%−U(n). One equation for calculating the utilization percentage is:

$$U(n) = \frac{1}{totalCycles}\left(\sum_{i=1}^{n} gotCycles_i\right) \times 100\%, \quad (2)$$

where $gotCycles_i$ is the number of cycles used by the ith measurement process.

In block 612, a test is made to determine whether the loop index n exceeds a predetermined threshold, and if not, the next loop iteration begins with block 604. Otherwise, in block 614, the background loss measurement is shown as a function of n. In some embodiments, the background loss is shown on display 104 in text (tabular) format or in a graphical fashion.

The measurement of background loss can be used to determine not only the processor overhead for a single user process (i.e., L(1)), but also the context switching penalty P for running multiple user processes (P≈L(2)−L(1)). In addition, on a multi-processor system, the background loss can be measured for each processor. One way to measure this loss is to run n×N measurement processes concurrently, where N is the number of processors and n is the number of measurement processes to be run on each processor. One of the processors in the multi-processor system is expected to have a noticeably higher background loss, perhaps due to that processor's additional duties to operate as a master or to execute miscellaneous daemon processes for the operating system. The user is now able to run experiments to further characterize system behavior, e.g., imposing changing loads or various known load types and analyzing the resulting loss observations.

In some situations it is desirable to determine additional characteristics of a processor's background loss. For example, in some situations a user desires to know the distribution of interrupt times and/or the distribution of times between interrupts. FIG. 7 shows an exemplary pseudo-code listing of an exemplary process for measuring lost and used time block distributions.

Beginning then in line 1 of FIG. 7, the "totalCycles" variable is initialized to zero. In lines 2-4, the histogram bins are initialized to zero. In line 5, a "start" variable is set equal to the current cycle counter value. Hereafter, in line 17, the "start" variable is reset immediately after a slow iteration is detected, so that this variable will indicate the start of a block of cycles wholly used by to the user process. In line 6, the "last" variable is set equal to the "start" variable. Hereafter, in line 19, the "last" variable will store previous cycle counter readings.

Lines 7-20 of FIG. 7 form a loop that is executed until a predetermined number of cycles have elapsed. In line 8, the "now" variable is set equal to the current value of the cycle counter. In line 9, the "diff" variable is set equal to the number of cycles between the "now" and the "last" variable. In line 10, the "totalCycles" variable is updated with the number of cycles for this iteration of the loop. In line 11, the number of elapsed cycles is compared to a threshold. Depending on the compiler and the processor, a suitable threshold value may be between 7 and 15 cycles.

If the number is less than the threshold, the iteration is determined to have been a fast loop, i.e., an iteration in which no interrupt occurred, and lines 12-18 are skipped. Otherwise, in line 12, a histogram bin number is determined for the number of elapsed cycles for the iteration. In some embodiments, there is a linear relationship between the number of elapsed cycles and the bin number, e.g., binNum=min(round (diff/BIN_SIZE), MAX_BIN). In other embodiments, a non-linear (but monotonically non-decreasing) relationship is employed to allow for higher resolution in some regions than in others.

In line 13, the histogram count for an iteration of that length is incremented. In line 14, the number of elapsed cycles between the "start" variable (which was reset immediately after the previous interrupt) and the "last" variable (which was set just before the current interrupt) is determined. In line 15, a histogram bin number is determined for this number of elapsed cycles, and in line 16, the histogram count for that number of cycles between interrupts is incremented. In line 17, the "start" variable is reset. Whether or not the loop iteration is slow, the "last" variable is set equal to the previous reading of the cycle counter in line 19.

Once enough cycles have elapsed, the histograms can be normalized and saved. In some embodiments, normalization is accomplished by summing all histogram bins values to get a total, then dividing each bin value by the total. After this normalization, each bin value indicates the fraction of events falling in each bin. As an alternative, each bin value can be divided by the measurement time to indicate the number of events per second falling within each bin.

The number of cycles required to complete a fast loop iteration should be minimized to ensure that the number of cycles per loop is distinctly smaller than the smallest noticeable interruption. One optimization is to declare the "start," "last" and "now" variables as register variables, thereby minimizing the number of cycles necessary for access.

In the exemplary distribution measurement process, the histograms may be given a uniform bin size. In practice, it may be preferred to employ gradually increasing bin sizes. For example, the first 64 bins (0-63) may be one cycle wide (e.g., bin 11 counts events of cycle length 11), the second 64 bins (64-127) may be two cycles wide (e.g., bin 64 counts events of cycle lengths 64 and 65), the third 64 bins (128-191) may be four cycles wide (e.g., bin 128 counts events of cycle length 192-195), the fourth 64 bins (192-255) may be eight cycles wide (e.g., bin 192 counts events of cycle length 448-455), and so on. The use of nonuniform bin sizes allows for fine resolution at small event lengths without requiring a correspondingly large histogram array. Often fine resolution is not needed for larger event lengths.

In some implementations the histogram range can be adjusted. For example, the smallest tracked event length can be set as dictated by previous measurements. This practice avoids wasting histogram bins on events that never occur, and additionally allows the bins with the finest granularity to be aligned with the smallest events that do occur.

The histogram of interrupt lengths are expected to reveal multiple peaks, each peak corresponding to a particular type of interrupt. For example, some sample-based profilers generate frequent interrupts of a short, but well-defined, length. These interrupts will manifest as a sharp peak on the left (short-length) side of the histogram.

In some situations, more precise characterization of the behavior of an interrupt type is desired. For example, it can be desired to determine the mean and standard deviation of a histogram peak. When the histogram bins are only one cycle wide such an analysis is straightforward, but additional data may be desirable when larger bin sizes are employed.

Thus, some distribution measurement processes provide for three arrays: the histogram array, the size-sum array, and the squared-sum array. When a bin in the histogram array is incremented, the event size is added to the corresponding bin in the size sum array, and the square of the event size is added to the corresponding bin in the squared-sum array. For example, assume an event cycle length of 450 has been measured, and that an event of this length would be stored in bin 192 of the histogram array. The value of bin 192 in the histogram array would be incremented by one; the value of bin 192 in the size-sum array would be incremented by 450; and the value of bin 192 in the square-sum array would be incremented by $450^2$.

Given these three arrays, the histogram array can be used to identify an interrupt peak and the bins associated with that peak. The sum of the histogram bins associated with that peak gives the number of events associated with that peak. The sum of the size-sum bins associated with that peak gives a size sum that, when divided by the number of events, gives the mean size for that peak. Finally, the sum of square-sum bins associated with that peak gives a sum of squares value. The standard deviation for the peak can then be calculated:

$$\sigma = \sqrt{\frac{B - \frac{A^2}{N}}{N}}, \qquad (3)$$

where B is the sum of squares, A is the sum of sizes, and N is the number of events.

The structure of a peak can give insight into the behavior of the corresponding interrupt. A very narrow peak might indicate that the interrupt handler executes predictably, performing roughly the same operations each time the handler is called. A broad peak might indicate the presence of tests, loops, and/or waits within the interruption. Bi-modal or multi-modal peaks might indicate branches or distinct modes, with the relative area of each peak indicating the relative prevalence of each mode. Peaks may be asymmetric with a sharp rise and a slow fall. A sharp rise may indicate a good code design, in which the average execution time is not much different from the minimum execution time. A sharp fall might indicate good cache utilization, whereas a slow fall might be symptomatic of poor cache utilization or scattered references to memory.

Figure 8:
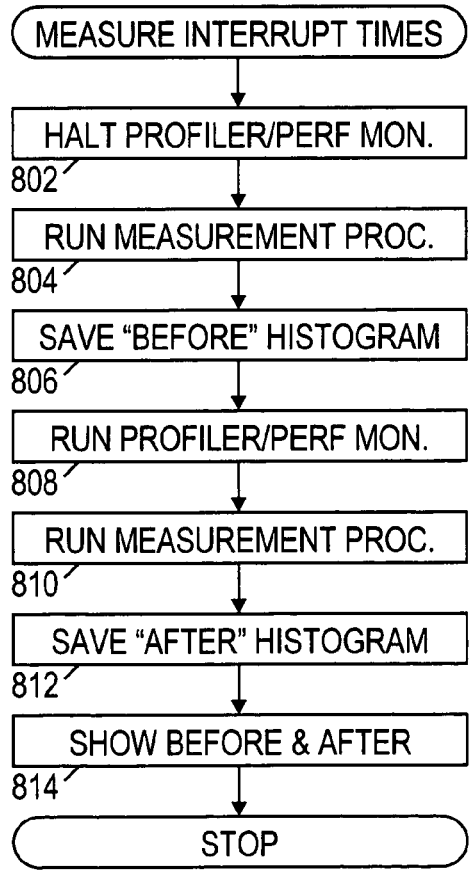
FIG. 8 is a flow diagram of an exemplary interrupt time measurement method in accordance with certain embodiments of the invention.

FIG. 8 shows an exemplary flow diagram for measuring interrupt behavior. In block 802, a profiler, performance monitor process, or other source of interrupts is disabled. In block 804, a distribution measurement process is executed to obtain an interrupt time histogram. In block 806, the histogram is stored as a "before" histogram. In block 808, the disabled interrupt process is enabled. In block 810, the distribution measurement process is executed again to obtain a second interrupt time histogram, which is stored as an "after" histogram in block 812. In block 814, the before and after histograms are displayed on display 104 for comparison. A comparison of the two histograms will reveal the peaks associated with the specific interrupts for the profiler, performance monitor process, or other source in question.

In an alternative embodiment, comparison of the histograms is simplified by subtracting the normalized "before" histogram from the normalized "after" histogram. This differencing technique serves to suppress peaks unrelated to the process in question.

Each of the foregoing exemplary methods can be implemented in the form of a compiled software program. The software can be stored on an information storage medium, communicated to the computer via a network connection, or simply typed in by a user.

The above discussion is meant to be exemplary of the principles and various embodiments of the present invention. Numerous variations and modifications will become apparent to those skilled in the art once the above disclosure is fully appreciated. For example, interrupt handlers may be modified to record cycle counter values at their entry and exit points, and to make these values accessible to the measurement process. The measurement process can then detect when these values lie between the "last" and "now" values and calculate interrupt entry delays and exit delays. These delays may then be measured and statistically analyzed.

As another example, the blocks and steps in the exemplary methods are shown in specific sequences above, but this should not be construed as requiring these sequences. To the contrary, the sequences can be rearranged, with some blocks and steps being added or deleted. It is intended that the following claims be interpreted to embrace all such variations and modifications.

What is claimed is:

1. A method of software execution:
   getting a current cycle counter value in a processor;
   finding a number of elapsed cycles between the current cycle counter value and a preceding cycle counter value in the processor;
   determining whether the number of elapsed cycles is indicative of lost cycles; and
   repeating said getting, finding, and determining to determine a lost-cycle measurement for the processor.

2. The method of claim 1, wherein said determining comprises comparing the number of elapsed cycles to a threshold value that approximates a minimum number of cycles needed for a loop iteration.

3. The method of claim 1, further comprising adding the number of elapsed cycles to a lost cycle counter if the number of elapsed cycles is indicative of lost cycles.

4. The method of claim 3, further comprising adding the number of elapsed cycles to a used cycle counter if the number of elapsed cycles is not indicative of lost cycles.

5. The method of claim 4, further comprising determining a correction factor using the used cycle counter, and further comprising applying the correction factor to the lost cycle counter.

6. The method of claim 3, further comprising using the lost cycle counter to calculate a cycle loss rate or a cycle loss fraction.

7. The method of claim 1, further comprising:
   adding the number of elapsed cycles to a used cycle counter when the number of elapsed cycles is not indicative of lost cycles, and
   determining a processor cycle utilization for one or more cycle loss measurement processes.

8. The method of claim 7, further comprising:
   determining a context switching overhead by comparing the processor cycle utilization for a single cycle loss measurement process executing alone to the processor cycle utilization for multiple cycle loss measurement processes executing concurrently.

9. The method of claim 1, further comprising updating a histogram to reflect a number of elapsed cycles between interrupts when the number of elapsed cycles is indicative of lost cycles.

10. The method of claim 1, further comprising updating a first histogram to reflect an interrupt length when the number of elapsed cycles is indicative of lost cycles.

11. The method of claim 10, further comprising:
    enabling or disabling at least one interrupt source;
    generating a second histogram of interrupt lengths; and
    comparing the first and second histograms to distinguish peaks associated with said at least one interrupt source.

12. The method of claim 10, further comprising accumulating one or more additional indications of interrupt length when the number of elapsed cycles is indicative of lost cycles, wherein the one or more additional indications allow for statistical characterization of a particular histogram peak.

13. A system comprising:
    a memory configured to store software;
    a processor coupled to the memory to execute the software, wherein the software configures the processor to carry out multiple loop iterations, each loop iteration including:
       reading a processor cycle counter;
       determining whether a reading from the processor cycle counter indicates that cycles were lost in a loop iteration;
       updating a slow loop count if cycles were lost in the loop iteration; and
       updating a fast loop count if cycles were not lost in the loop iteration.

14. The system of claim 13, wherein each loop iteration further includes:
    accumulating a number of fast loop cycles and a number of slow loop cycles.

15. The system of claim 14, wherein the software further configures the processor to determine a measure of background processor cycle loss from one or more accumulated cycle numbers.

16. The system of claim 13, wherein each loop iteration further includes:
    updating an interrupt time histogram if cycles were lost in the loop iteration.

17. The system of claim 13, wherein each loop iteration further includes:
    updating an uninterrupted time histogram if cycles were lost in the loop iteration.

18. Application instructions on a computer-usable medium where the instructions, when executed, effect a lost-cycle measurement, the instructions comprising:
    a loop that is iterated multiple times to determine a cycle count for each iteration, to determine whether each iteration is an interrupted iteration or an uninterrupted iteration, and to accumulate a cycle count for interrupted iterations, a cycle count for uninterrupted iterations, an interrupted iteration count, and an uninterrupted iteration count;
    correction code that determines a correction factor to account for cycles not lost during interrupted iterations;
    lost-cycle calculation code that determines the lost-cycle measurement from the cycle count for interrupted iterations and the correction factor; and
    got-cycle calculation code that determines a got-cycle measurement from the cycle count for uninterrupted iterations and the correction factor.

19. The application instructions of claim 18, further comprising:
    an outer loop that is iterated for at least two different numbers of executing processes to determine variation in the lost-cycle measurement as a function of the number of executing processes.

20. The application instructions of claim 18, wherein the loop includes:
    histogram code that accumulates a distribution of interrupt durations and a distribution of durations between interrupts.

* * * * *